(12) United States Patent
Choi et al.

(10) Patent No.: US 9,169,918 B2
(45) Date of Patent: Oct. 27, 2015

(54) INTEGRATED CONTROL SHIFT LEVER DEVICE

(75) Inventors: Jeehyuck Choi, Hwaseong-si (KR); Yangrae Cho, Hwaseong-si (KR); Chunnyung Heo, Gyeongsan-si (KR); Kwanggi Lee, Daegu (KR)

(73) Assignees: HYUNDAI MOTOR COMPANY, Seoul (KR); KIA MOTORS CORPORATION, Seoul (KR); SL CORPORATION, Dae-Gu (KR)

( * ) Notice: Subject to any disclaimer, the term of this patent is extended or adjusted under 35 U.S.C. 154(b) by 1002 days.

(21) Appl. No.: 13/306,665

(22) Filed: Nov. 29, 2011

(65) Prior Publication Data
US 2013/0025397 A1   Jan. 31, 2013

(30) Foreign Application Priority Data
Jul. 29, 2011   (KR) .................. 10-2011-0075855

(51) Int. Cl.
*B60K 17/04* (2006.01)
*F16H 59/02* (2006.01)
*F16H 61/24* (2006.01)

(52) U.S. Cl.
CPC ............ *F16H 59/0204* (2013.01); *F16H 61/24* (2013.01); *F16H 2061/243* (2013.01); *Y10T 74/2003* (2015.01)

(58) Field of Classification Search
CPC ............... F16H 2061/242; F16H 2061/247; F16H 61/24; F16H 2061/243; F16H 59/0204; F16H 2059/082; F16H 2059/084; F16H 2059/085
USPC ............... 74/473.12, 473.24, 473.25, 473.32, 74/473.3; 701/52, 53
See application file for complete search history.

(56) References Cited

U.S. PATENT DOCUMENTS

| | | | | |
|---|---|---|---|---|
| 6,089,118 | A * | 7/2000 | Ishii et al. .................. | 74/473.18 |
| 6,199,003 | B1 * | 3/2001 | Hollingsworth et al. ....... | 701/52 |
| 6,401,564 | B1 * | 6/2002 | Lee ........................... | 74/473.18 |
| 6,598,494 | B1 * | 7/2003 | Giefer ........................ | 74/473.18 |
| 6,622,583 | B2 * | 9/2003 | Wang .......................... | 74/473.2 |
| 6,761,084 | B2 * | 7/2004 | Suzuki et al. ............... | 74/473.33 |
| 6,857,335 | B2 * | 2/2005 | Kahara ....................... | 74/473.33 |
| 6,895,833 | B2 * | 5/2005 | Cho ........................... | 74/473.18 |
| 6,966,237 | B2 * | 11/2005 | Scheib et al. .............. | 74/473.12 |

(Continued)

FOREIGN PATENT DOCUMENTS

| | | |
|---|---|---|
| JP | 2003-72410 A | 3/2003 |
| JP | 2005-319840 A | 11/2005 |

(Continued)

*Primary Examiner* — William Kelleher
*Assistant Examiner* — Zakaria Elahmadi
(74) *Attorney, Agent, or Firm* — Morgan, Lewis & Bockius LLP

(57) ABSTRACT

An integrated control shift lever device according to an exemplary embodiment provides M mode of +/− to feel a dynamic shift manipulation feeling together with automatic mode of P (parking), R (reverse), N (neutral), and D (driving) as a basic function and further provides integrated mode 6 to provide to engine control unit the electrical signal generated by positional change of automatic lever to control the engine, suspension device, or the steering device in addition to the transmission by driver's simple manipulation, thereby significantly improving convenience and in particular, further improving performance, quality, and merchantability of an automobile when the integrated control shift lever device may be applied to a vehicle.

13 Claims, 17 Drawing Sheets

(56) References Cited

U.S. PATENT DOCUMENTS

| | | | |
|---|---|---|---|
| 7,028,575 B2 * | 4/2006 | Ehrmaier et al. | 74/473.18 |
| 7,029,421 B2 * | 4/2006 | Henneken et al. | 477/120 |
| 7,219,572 B2 * | 5/2007 | Syamoto | 74/473.33 |
| 7,293,480 B2 * | 11/2007 | Matsui et al. | 74/473.12 |
| 7,360,469 B2 | 4/2008 | Tomida | |
| 7,441,474 B2 * | 10/2008 | Kliemannel et al. | 74/335 |
| 7,694,604 B2 * | 4/2010 | Sickart et al. | 74/473.18 |
| 7,750,624 B2 * | 7/2010 | Heo et al. | 324/207.23 |
| 8,261,630 B2 * | 9/2012 | Bak et al. | 74/473.12 |
| 8,434,383 B2 * | 5/2013 | Park et al. | 74/473.18 |
| 2001/0004850 A1 * | 6/2001 | Kim | 74/473.12 |
| 2003/0119626 A1 * | 6/2003 | Loeffler | 477/34 |
| 2005/0056109 A1 * | 3/2005 | Kim | 74/473.3 |
| 2007/0234843 A1 * | 10/2007 | Knabe | 74/523 |
| 2009/0038426 A1 * | 2/2009 | Buttolo et al. | 74/473.3 |
| 2010/0083784 A1 * | 4/2010 | Bortolon et al. | 74/473.21 |
| 2010/0242658 A1 * | 9/2010 | Patzold | 74/473.24 |
| 2013/0000436 A1 * | 1/2013 | Ueno | 74/473.12 |
| 2014/0290421 A1 * | 10/2014 | Baumer et al. | 74/491 |

FOREIGN PATENT DOCUMENTS

| | | |
|---|---|---|
| KR | 10-0401079 B1 | 10/2003 |
| KR | 10-2008-0021386 A | 3/2005 |
| KR | 10-0535012 B1 | 12/2005 |
| KR | 10-0603113 B1 | 7/2006 |

* cited by examiner

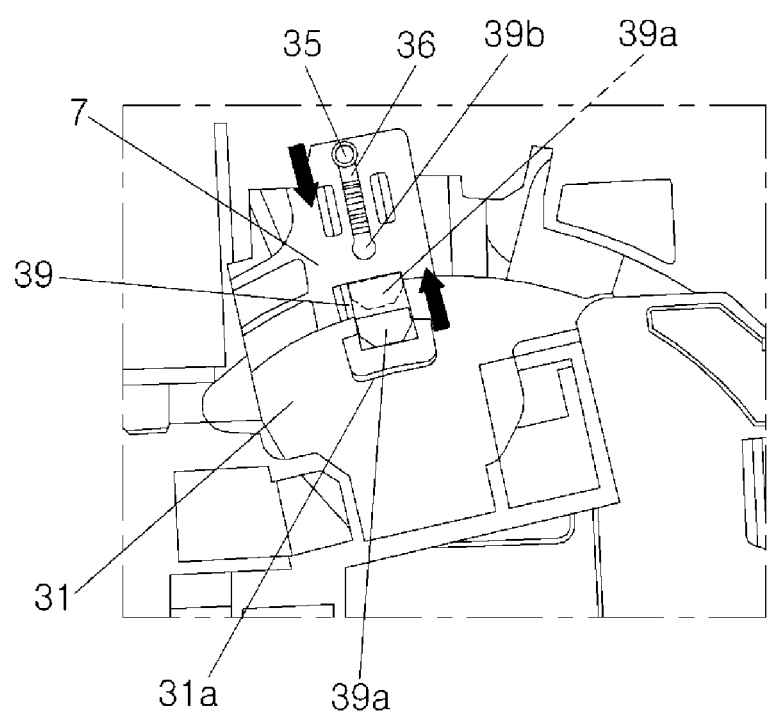

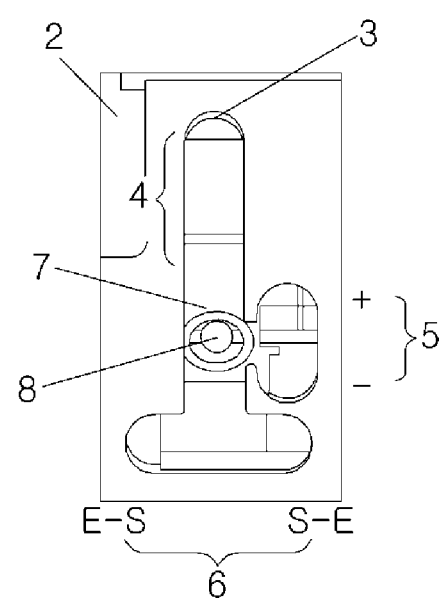

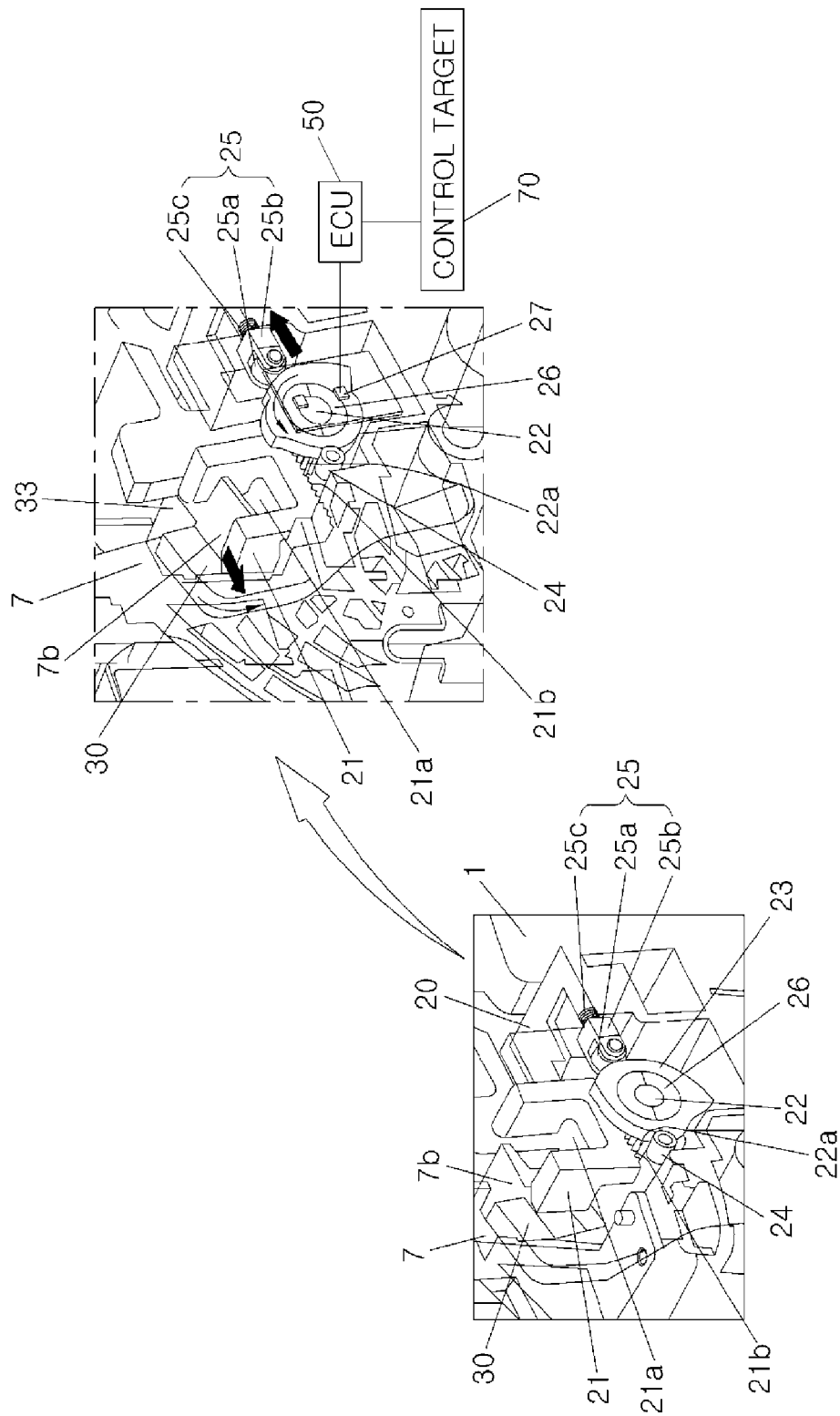

INTEGRATED CONTROL SHIFT LEVER DEVICE

CROSS-REFERENCE TO RELATED APPLICATIONS

The present application claims priority to Korean Patent Application No. 10-2011-0075855 filed Jul. 29, 2011, the entire contents of which application is incorporated herein for all purposes by this reference.

BACKGROUND OF THE INVENTION

1. Field of the Invention

The present invention relates to a shift lever device which is an operating device of a vehicle, and more particularly, to an integrated control shift lever device in which various additional modes are further implemented in addition to an M (sports) mode to maximize driver convenience.

2. Description of Related Art

In general, a shift lever as an operating device for changing a shift stage of a manual transmission, a mechanical automatic transmission, or an automatic transmission depending on a vehicle speed moves along gate patterns for implementing the shift patterns, such as P (parking), R (reverse), N (neutral), and D (driving).

Satisfaction of quality and merchantability of a vehicle depends on a shift operating feeling made while driving an automobile and in addition, cannot but largely depend on even a shift pattern capable of satisfying a driver's shift taste.

As an example for satisfying the driver's shift taste, there is provided a so-called tipstronic type shift lever device that enables operating a manual transmission mode of a manual transmission sense in an automatic transmission vehicle.

FIG. 12 shows a gate pattern routinely applied to the tiptronic type shift lever device.

FIG. 12A shows a gate pattern 110 in which an automatic transmissions mode 120 of P (parking), R (reverse), N (neutral), and D (driving) and a manual transmission mode 130 of 2-L arranged on a straight line on an indicating panel 100, FIG. 12B shows a gate pattern 210 in which an automatic transmission mode 220 of P (parking), R (reverse), N (neutral), and D (driving) and a manual transmission mode 230 of +/− are arranged on an indicating panel 200 in a J shape, and FIG. 12C shows a gate pattern 310 in which an automatic transmission mode 320 of P (parking), R (reverse), N (neutral), and D (driving) and a manual transmission mode 330 of +/− are arranged on an indicating panel 300 in an H shape.

Routinely, automatic transmission modes 120, 220, and 320 are called an automatic mode and manual transmission modes 130, 230, and 330 are called a sports mode or an M mode.

Automatic transmission modes 120, 220, and 320 are modes in which the shift stage is changed depending on P (parking), R (reverse), N (neutral), and D (driving) and manual transmission modes 130, 230, and 330 are modes in which the shift lever can be fixed by decelerating or accelerating one stage from a current shift stage according to driver's needs while the vehicle is driven with the shift lever operated to the sate of the automatic transmission.

That is, in manual transmissions modes, 130, 230, and 330, when the shift lever moves to manual transmission modes 130, 230, and 330 branched from D (driving), the current shift stage is held and in this state, when the shift lever is pulled to the rear side and released, the current shift stage can be decelerated (−) by one-stage downshift, while when the shift lever is pushed to the front side and released, the shift lever can be accelerated (+) by one-stage upshift.

In the operation, a driver does not need to stage a clutch pedal or take his/her foot off an acceleration pedal to feel rapid shift responsiveness unlike a manual transmission and therefore, satisfaction of the quality and merchantability of the vehicle in addition to the shift operating sense can be significantly by satisfying the driver's shift taste.

However, there is a trend that the driver intends to receive more conveniences from the automobile and as an example to follow the trend, there can be provided a smart shift lever capable of significantly increasing the quality and the merchantability of the vehicle through a shift operation.

The smart shift lever uses a controller (TCU or ECU) sensing a positional change of a lever and an actuator transferring the positional change to a motive power unlike the shift lever mechanically connected with the transmission.

Even in this case, the driver changes the shift lever to a desired shift stage by changing the position of the shift lever according to the gate pattern, but other additional functions can be implemented more variously and conveniently.

The smart shift lever is used as an operating deice for all types of transmissions and as a representative example adopting the smart shift lever, there can be provided a shift by wire (SBW) type transmission system.

An example of an additional function for implementing various operating functions applied to the smart shift lever can include parking release actuator (PRA) configuration.

This is one example of an additional function capable of strengthening a failure of the TCU controlling the transmission, turn-off an engine, or N-stage parking/car washing/manual release/malicious releasing cut-off by sending a control signal to the parking release actuator (PRA) when the shift lever is located at a predetermined position of the gate pattern.

The driver who receives more conveniences through the smart shift lever cannot but intend to more and more conveniences, and as a result, requirements for the quality and the merchantability that has bee increased should be satisfied by implementing more functions even in the smart shift lever.

Korean Patent Application Laid-Open No. 10-2008-0021386 (Mar. 7, 2008) relates to a shift lever device for switching a mode.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an integrated control shift lever device which enables a dynamic shift operating sense such as an M (sports) mode and can implement convenience to enable engine controlling, suspension controlling, and steering controlling with an electrical signal depending on positional operation of an automatic lever by a control signal other than a transmission mode at a predetermined gate pattern position of the automatic lever while implementing various transmission modes.

An exemplary embodiment of the present invention provides an integrated control shift lever device, including a gate pattern in which an automatic lever moving with being gripped by a hand moves in an automatic mode of P (parking), R (reverse), N (neutral), and D (driving) as a basic movement path, wherein in the gate pattern, an M mode in which an electrical signal for a + mode which is a 1-stage upshift acceleration state and a − mode which is a 1-stage downshift deceleration state is generated by moving the position of the automatic lever is branched from a D (driving) position to one side part of the automatic mode, and an integrated mode in which another electrical signal for controlling components of a vehicle regardless of control of a transmission is generated by moving the position of the automatic lever is linked to a straight path from the D (driving) position to be branched to a position which does not interfere with the M mode.

In the integrated mode, different electrical signals may be generated at E-S and S-E positions which are different movement positions of the automatic lever.

The integrated mode may be implemented by using an integrated mode sensor unit assigning an effort feeling as the automatic lever enters the integrated mode and sensing entrance positions of an E-S integrated mode and an S-E integrated mode, a driving holding unit holding a D (driving) state even though the automatic lever moves to the E-S integrated mode and the S-E integrated mode, and a manipulation feeling unit assigning a shift manipulation feeling depending on manipulating of the E-S integrated mode or the S-E integrated mode.

The integrated mode sensor unit may include a movement block 21 coupled to the shift rod coupled with the automatic lever and hinge-coupled to the lever housing through a shift shaft when the automatic lever moves toward the integrated mode and a mode changing detecting unit detecting E-S→S-E positional movement and generates an effort feeling while switching linear movement into rotational motion of movement block 21 depending on movement of the automatic lever from the E-S to the S-E.

The mode changing detecting unit may include an eccentric cam that rotates by being rack-pinion-coupled with the movement block, a pair of rollers supporting the eccentric cam at both lateral sides and at least one side is pushed due to phase change by rotation of the eccentric cam to be compressed and elastically transformed to form the effort feeling, and a sensing member the electrical signal for the E-S integrate mode or S-E integrated mode by detecting the phase change by the rotation of the eccentric cam.

The sensing member may adopt a non-contact type.

The sensing member may include a magnet that rotates together with the eccentric cam while being installed at the eccentric cam and a detection sensor sensing N-S polar change depending on the rotation of magnet and transmitting an electrical signal transmitted to an ECU.

The driving holding unit may include an engaging lever connected with a control cable pulled depending on P (parking), R (reverse), N (neutral), and D (driving) which are the automatic mode, which change the shift stage, an M holding member holding the engaging lever in an M mode state after the automatic lever enters the M mode, an integrated mode holding member holding the engaging lever in the integrated mode state, and an interworking cancelling member holding the D (driving) position after entering the M mode or integrated mode by decoupling the shift rod at the time of pressing the safety button provided in the automatic lever.

The M holding member and the integrated mode holding member may similarly include a lock pin that fixes the shift rod to the lever housing by pressing the engaging lever by receiving force from the transmission rod when the shift rod moves and a return spring compressed when the lock pin is pushed to generate elastic repelling power.

The interworking cancelling member may decouple the engaging lever and the shift rod from each other by action of a solenoid actuated by the ECU sensing the pushed safety button.

The manipulation feeling unit may include a groove formed by using an inner surface of the lever housing on a movement path of the M mode and the integrated mode of the shift rod and a bullet moving in contact with the groove.

The groove may include an M groove forming the shift manipulation feeling for the D (driving) position and an integrated mode groove forming the shift manipulation feeling for the integrated mode and the M groove and the integrated mode groove may be depressed more deeply with respect to the D groove to form stages.

The bullet may be coupled by using a bullet shaft formed in a lower part of the shift rod. and the bullet may have the end portion contacting the groove, which has a ball shape.

According to exemplary embodiments of the present invention, it is possible to provide better convenience in addition to more functions to a driver by enabling engine controlling, suspension controlling, and steering controlling with an electrical signal depending on a predetermined positional change of an automatic lever for a gate pattern even while basically providing a dynamic transmission operating sense such as an M (sports) mode.

Further, by conveniently implementing various functions other than a transmission mode with the electrical signal depending on the predetermined positional change of the automatic lever for the gate pattern, the performance, quality, and the merchantability of an automobile can be further improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9 is a diagram showing movement to the integrated mode and the resulting operation of the integrated mode sensor unit according to the exemplary embodiment of the present invention.

Figure 1:
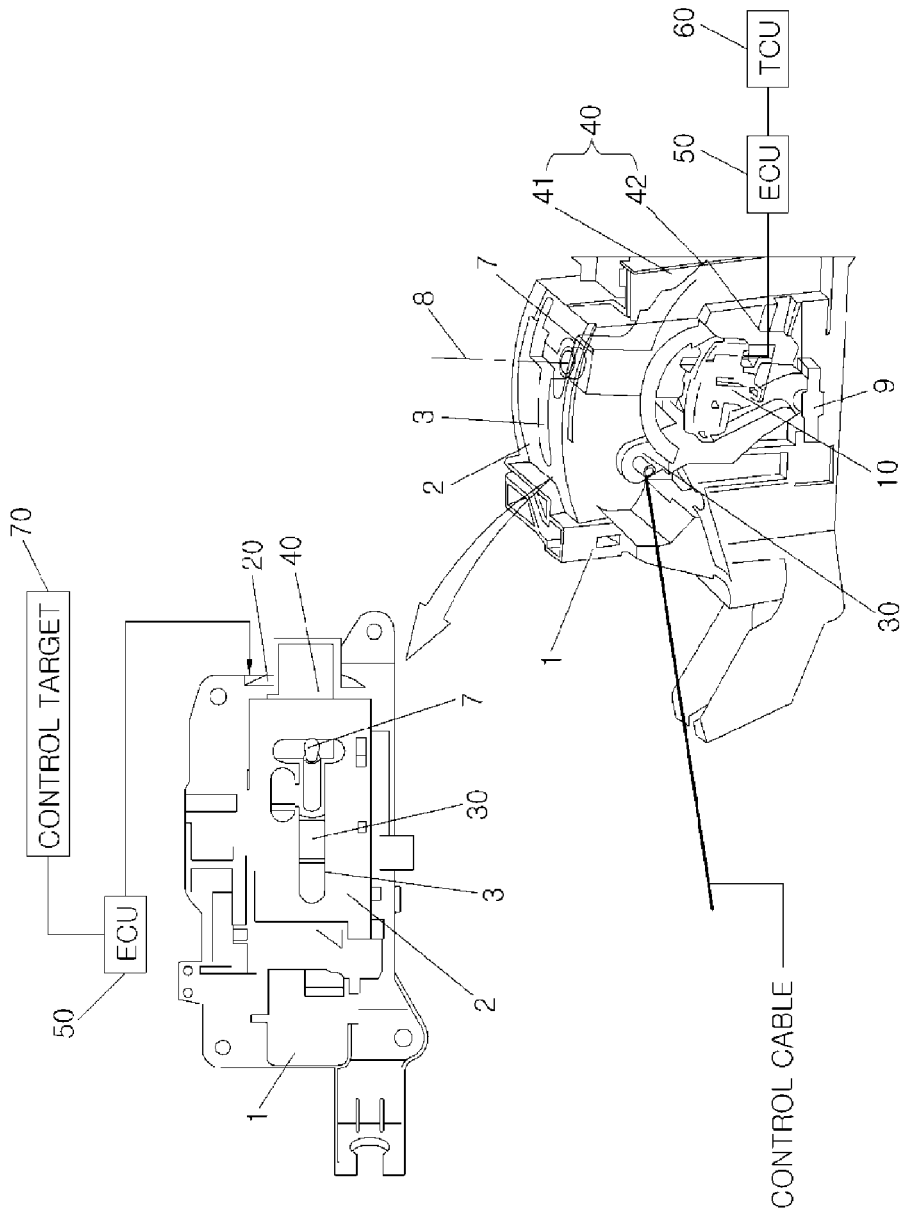
FIG. 1 is a configuration diagram of an integrated control shift lever device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the exemplary embodiments.

Referring to FIG. 1, the integrated control shift lever device includes a lever housing 1 provided around a driver's seat, a shift rod with a driver's operating automatic lever 8 positioned-changed depending on an automatic mode, an M mode, and an integrated mode of a gate pattern 3, an M sensor unit 10 performing an M mode position changing process of automatic lever 8 and an M stage control signal according thereto, an integrated mode implementing section performing an integrated mode position changing process of automatic lever 8 and various integrated control signals according thereto, and an engine control unit (ECU) 50 controlling a transmission control unit (TCU) 60 according to a shift stage depending on changes to the automatic mode and the M mode of automatic lever 8 and further including a control logic of a control target 70 which is a vehicle electronic component other than the transmission while controlling TCU 60 at the time of changing the mode to the integrated mode.

A lower part of shift rod 7 is hinge-joined to lever hosing 1 through a shift shaft 9.

Automatic lever 8 which a driver holds and operates in connection with shift rod 7 is positioned in a gate pattern 3 formed on an indicating panel 2 forming the top surface of lever housing 1.

A safety button which the driver presses with his/her finger is provided in automatic lever 8. The safety button is a device routinely applied to basically provide a releasing operation of a locking state of automatic lever 8 when an engine starts.

In the exemplary embodiment, the safety button is configured to release a connection state between an engaging lever 31 connected with a control cable which changes the shift stage according to P (parking), R (reverse), N (neutral), and D (driving) and automatic lever 8 and the configuration will be described below in detail.

Figure 2:
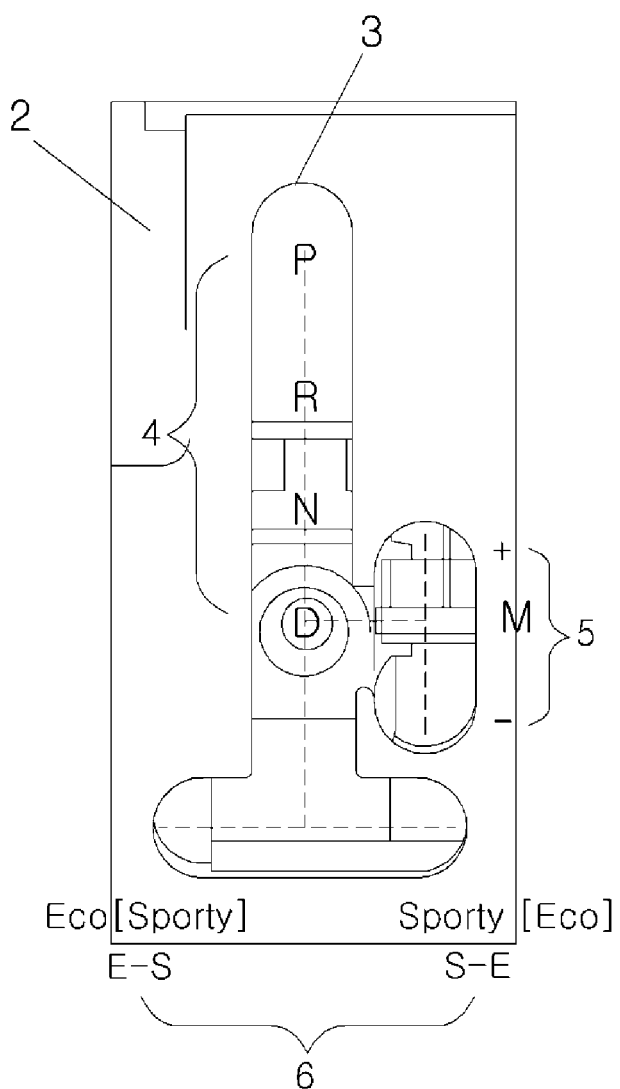
FIG. 2 shows a gate pattern according to the exemplary embodiment of the present invention.

Referring to FIG. 2, gate pattern 3 basically includes the automatic mode and the M mode for changing the shift stage and further includes the integrated mode providing one or more functions other than the automatic mod and the M mode to implement more various control functions.

To this end, gate pattern 3 is constituted by an automatic mode 4 of P (parking), R (reverse), N (neutral), and D (driving), an M mode 5 of +/− branched to one surface of automatic mode, and an integrated mode 6 of E-S/S-E branched to the opposite surface of automatic mode 4.

Herein, the S-E represents Sport-Eco and the E-S represents Eco-Sport.

A branching position of M mode 5 is a D (driving) position of automatic mode 4 and a branching position of integrated mode 6 is branched at the end of a straight path of automatic mode 4.

In gate pattern 3, integrated mode 6 is called a D-E type J positioned below M mode 5.

As described above, automatic mode 4 is an automatic transmission control mode in which the shift stage is shifted according to P (parking), R (reverse), N (neutral), and D (driving) and M mode 5 is a manual transmission control mode in which one stage is decelerated (−) or accelerated (+) from a current shift stage and they are the modes which are routinely implemented.

In integrated mode 6, the electrical signal for controlling control target 70 which is the vehicle electronic component other than the transmission can be generated by pushing to the right side (in FIG. 2) and releasing (S-E) automatic lever 8 or pushing to the left side (in FIG. 2) and releasing (E-S) automatic lever 8. The electrical signal generated in integrated mode 6 is routinely inputted into ECU 50.

Figure 3:
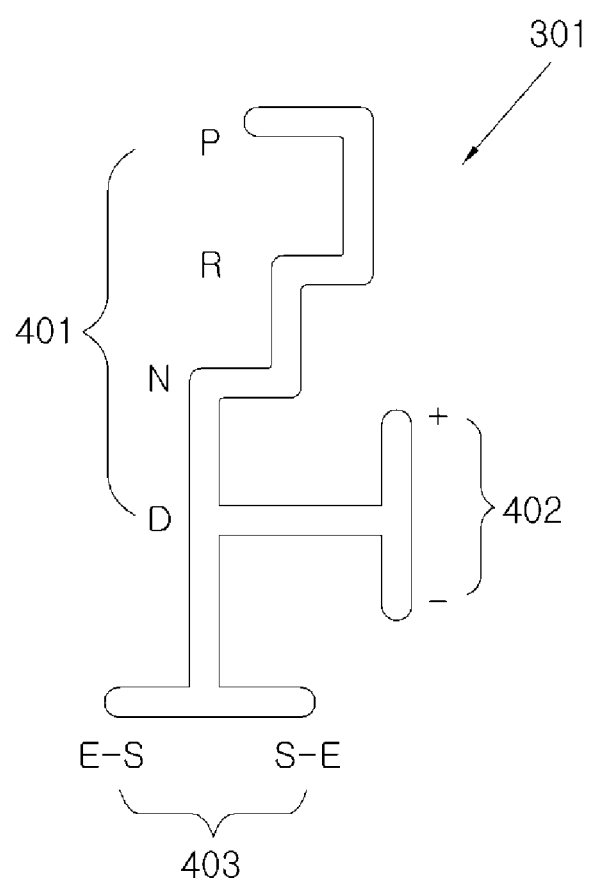
FIG. 3 is a modified example of the gate pattern according to the exemplary embodiment of the present invention.

Gate pattern 3 may be modified variously and FIG. 3 shows a modified example.

A gate pattern 301 of FIG. 3 as a D-E type H is constituted by an automatic mode 401 configured so that P (parking), R (reverse), N (neutral), and D (driving) have the stages, an M mode 402 of +/− branched to the right lateral surface (in FIG. 3) from D (driving) of automatic mode 401, and an integrated mode 403 of E-S/S-E branched to both portions of the left side (in FIG. 3) at the end of a straight path linked from D (driving) of automatic mode 401.

In gate pattern 301, integrated mode 403 is positioned below M mode 402.

In the exemplary embodiment, gate patterns 3, 301, 302, and 303 have the same implementation function and are appropriately applied as necessary.

Figure 4:
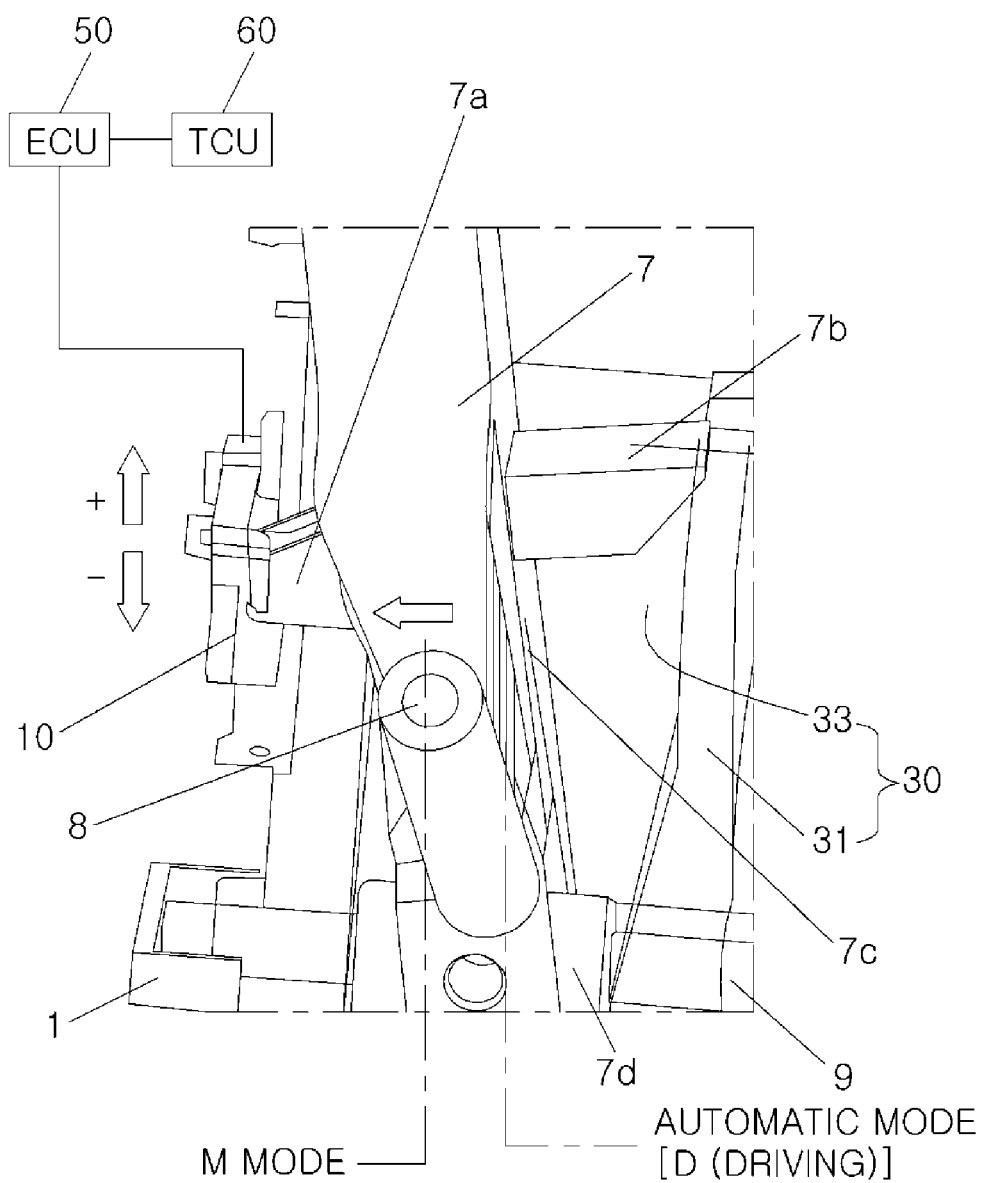
FIG. 4 is a configuration diagram of an M sensor according to the exemplary embodiment of the present invention.

Referring to FIG. 4, a M sensor unit 10 is installed around lever housing 1 forming M mode 5 to sense forward pushing (+) and backward pulling (−) of automatic lever 8 and provide an electrical signal for the sensed M+ or M− position to ECU 50, such that M+ or M− shift control through TCU 60 is implemented.

That is, when the driver intends to implement M mode 5 while driving in D (driving) of automatic mode 4, M mode 5 is performed by pushing automatic lever 8 to M mode 5 to move shift rod 7 and thereafter, slightly pushing automatic lever 8 to M+ or slightly pulling automatic lever 8 to M−.

In this case, M sensor unit 10 senses that a first lever protrusion 7a that protrudes on one side surface of shift rod 7 coupled with automatic lever 8 moves to M+ and moves M− and as described above, M+ of M mode 5 means an 1-stage downshift acceleration state and M− of M mode 5 means a 1-stage downshift deceleration state.

Figure 5:
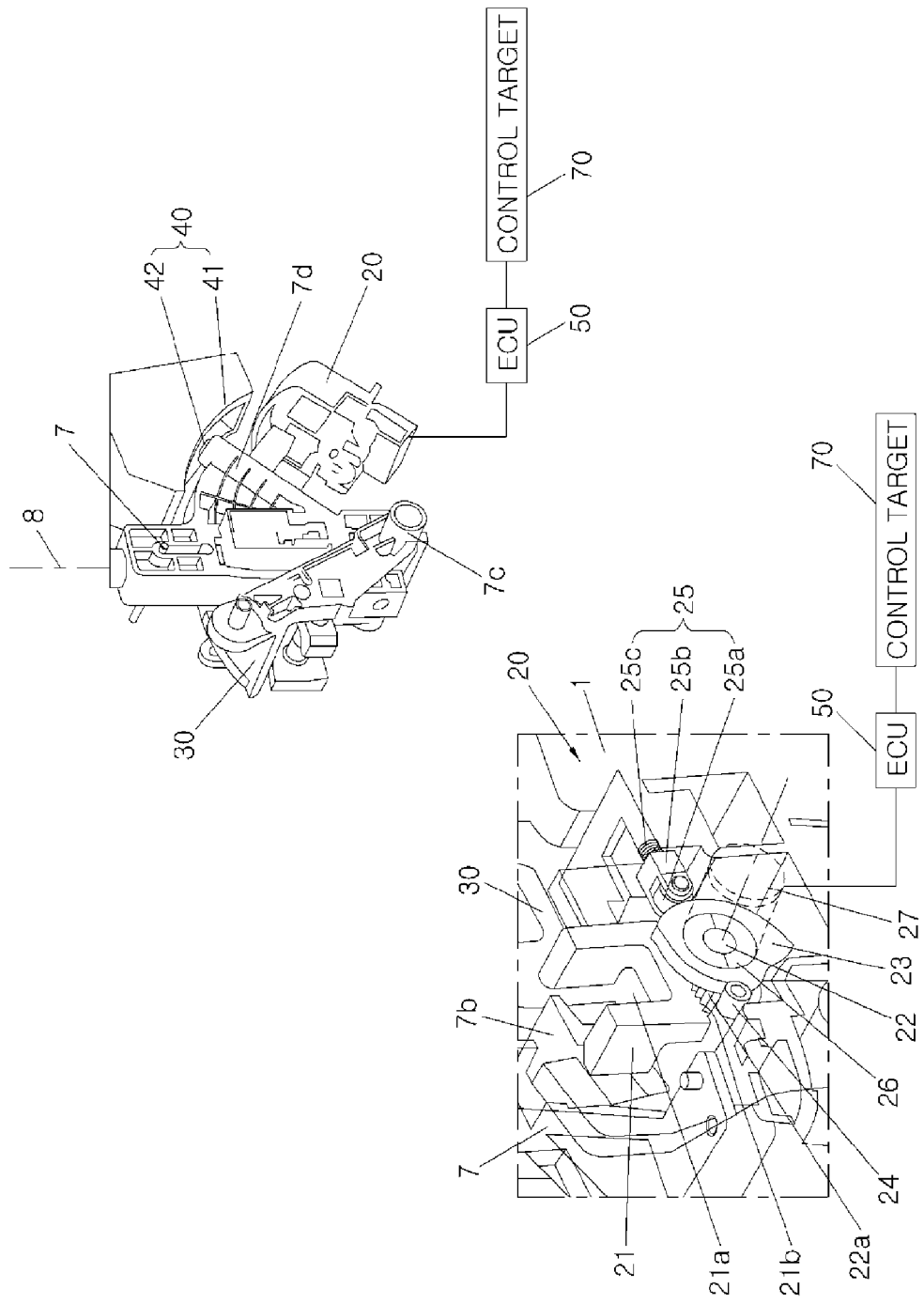
FIG. 5 is a configuration diagram of an integrated mode sensor according to the exemplary embodiment of the present invention.

Referring to FIG. 5, the integrated mode implementing section is installed around lever housing 1 to assign an effort as automatic lever 8 enters the integrated mode and includes an integrated mode sensor unit 20 sensing entrance positions of an E-S integrated mode and an S-E integrated mode, a driving holding unit 30 holding a D (driving) state even though automatic lever 8 moves to the E-S integrated mode and the S-E integrated mode, and a shift feeling unit 40 assigning a shift manipulation feeling depending on manipulating the E-S integrated mode or the S-E integrated mode.

The E-S integrated mode is a mode in which the electrical signal is generated when automatic lever 8 is pushed to the left side and released and the S-E integrated mode is a mode in which the electrical signal is generated when automatic lever 8 is pushed to the right side and released, and the modes are similar as the M+ and M− modes of M mode 5.

However, M+ and M− electrical signals of M mode 5 are outputted to TCU 60 through ECU 50, while E-S and S-E electrical signals of integrated mode 6 are outputted to control target 70 through ECU 50.

In this case, ECU 50 differently recognizes the E-S electrical signal and the S-E electrical signal to differentiate output signals provided to control target 70.

In the exemplary embodiment, control target 70 as an electronic control type electronic device includes, for example, an engine, an electronic suspension device, or a motor-driven steering device which is controlled according to a control logic included in ECU 50 as an example, but include all electronic control type electronic devices by using diversity of the electrical signals generated in integrated mode 6 when control target 70 is actually applied to a vehicle.

Integrated mode sensor unit 20 includes a movement block 21 coupled to shift rod 7 to which automatic lever 8 is fixed to follow a movement of shift rod 7 when automatic lever 8 moves toward integrated mode 6 and a mode changing detecting unit detecting E-S→S-E positional movement and generates an effort feeling while switching linear movement into rotational motion of movement block 21 depending on movement of automatic lever 8 toward the E-S integrated mode and the S-E integrated mode.

A structure for movement block 21 to follow motion of shift rod 7 may be applied variously, but in the exemplary embodiment, a structure in which an opened interworking space 21a is formed in movement block 21 and a second lever protrusion 7b protrudes on one side surface of shift rod 7 is applied.

As a result, when automatic lever 8 moves to integrated mode 6, second lever protrusion 7b of shift rod 7 may engage in interworking space 21a of movement block 21 due to movement of automatic lever 8.

The mode changing detecting unit includes a rotary shaft 22 that rotates with a pinion 22a engaged with a rack gear 21b formed in movement block 21, an eccentric cam 23 that rotates together while being fixed to rotary shaft 22 and has a protruded portion formed at an opposite position thereto, a roller generating repelling power caused by phase change of eccentric cam 23, and a sensing member generating the electrical signals for the E-S integrated mode or the S-E integrated mode by detecting phase change caused by rotation of eccentric cam 23.

The roller includes a fixed roller 24 that rotates while being installed around lever housing 1 and is in direct contact with eccentric cam 23 and a variable roller 25 that is pushed from eccentric cam 23 and pulled to eccentric cam 23 depending on phase change of eccentric cam 23 while being installed around lever housing 1 at an opposite side to fixed roller 24.

Variable roller 25 includes a roller 25a that receives direct force depending on phase change of eccentric cam 23, a bracket 25b coupled to a hinge shaft to rotate roller 25a, and an elastic member 25c that is elastically compressed when bracket 25b is pushed while elastically supporting bracket 25b.

Elastic member 25c adopts a coil spring.

The sensing member is a non-contact type. To this end, the sensing member includes a magnet 26 that rotates together with eccentric cam 23 while being installed at eccentric cam 23 and a detection sensor 27 sensing polar change depending on the rotation of magnet 26.

As a result, detection sensor 27 serves to sense phase change of poles N and S depending on the rotation of magnet 26 on a front part of magnet 26 that rotates together with cam 23 and convert the sensed phase change into the electrical signal and transmit the electrical signal to ECU 50.

Figure 6:
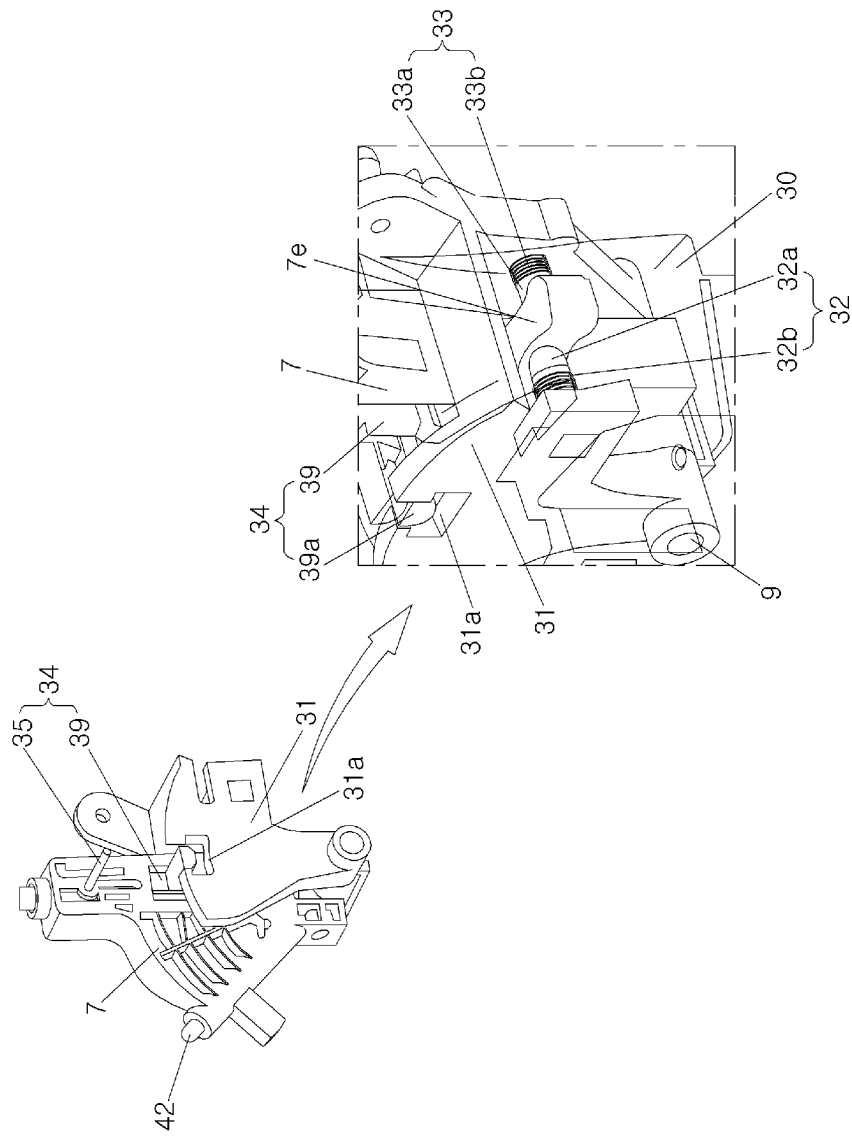
FIG. 6 shows a configuration diagram of en engaging lever that fixes the D (driving) position when changing a mode to an integrated mode according to the exemplary embodiment of the present invention.

Referring to FIG. 6, driving holding unit 30 includes an engaging lever 31 connected with a control cable pulled depending on P (parking), R (reverse), N (neutral), and D (driving) which are automatic mode 4, which change the shift stage, an M holding member 32 holding engaging lever 31 in an M mode state after automatic lever 8 enters M mode 5, an integrated mode holding member 33 holding engaging lever 31 in the integrated mode state, and an interworking cancelling member 34 holding the D (driving) position after entering M mode 5 or integrated mode 6 by decoupling shift rod 7 at the time of pressing the safety button provided in automatic lever 8.

Engaging lever 31 has side parts at both lateral sides and receives shift rod 7 in an inner space thereof and is coupled to lever housing with shift shaft 9 as the hinge shaft to pull the connected control cable.

M holding member 32 includes a lock pin 32a generating fixation power to lever housing 1 by receiving force from one contact surface 7e of shift rod 7 and pressing one side part (left) of engaging lever 31 when shift rod 7 moves to M mode 5 and a return spring 32b compressed when lock pin 32a is pushed to generate elastic repelling power.

Integrated mode holding member 33 includes a lock pin 33a generating the fixation power to lever housing 1 by receiving force from opposite contact surface 7e of shift rod 7 and pressing the opposite side part (right) of engaging lever 31 when shift rod 7 moves to integrated mode 6 and a return spring 33b compressed when lock pin 33a is pushed to generate the elastic repelling power.

Herein, lock pins 32a and 33a are coupled with ends thereof inserted into groove portions at both side parts (left and right) of engaging lever 31.

Returning spring 33b adopts a coil spring type.

Interworking cancelling member 34 is configured to hold engaging lever 31 while the safety button provided in automatic lever 8 is pressed to decouple engaging lever 31 and shift rod 7 from each other and a configuration of FIG. 7 shows one example which is routinely applied.

Figure 7A:
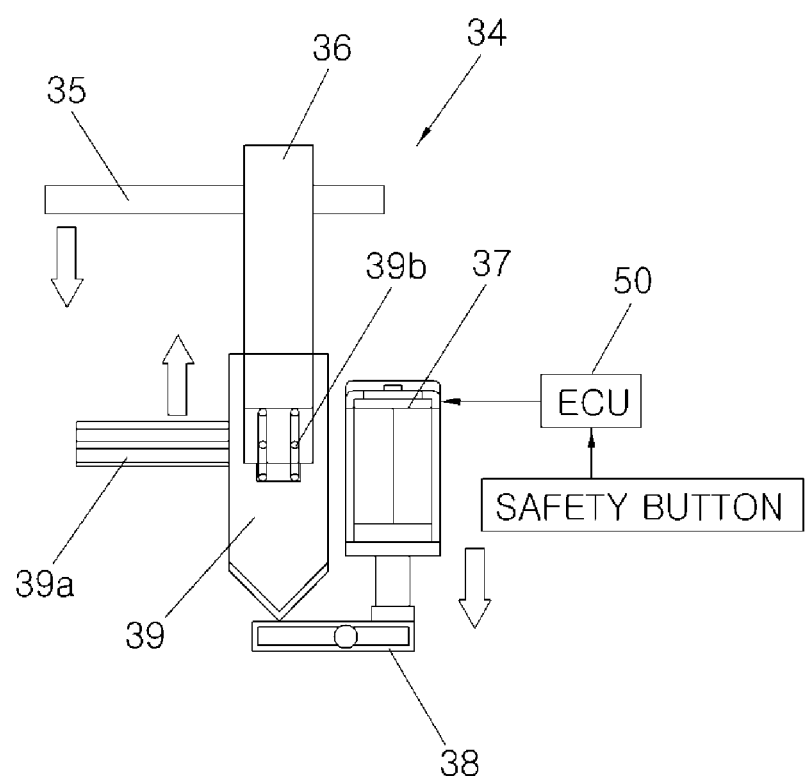
FIG. 7 is a configuration diagram of an interworking cancelling member that allows the engaging lever to maintain the D (driving) position after changing an M mode or the integrated mode by decoupling the engaging lever changing a shift stage at the time of manipulating the safety button according to the exemplary embodiment of the present invention.

As shown in FIG. 7A, interworking cancelling member 34 includes an interworking pin 35 that moves up and down around shift rod 7 to penetrate a tub 36, a solenoid 37 that is operated by controlling ECU 50 sensing manipulation of the safety button, an interworking lever 38 in which the opposite portion moves up through leverage action when a rod of solenoid 37 is drawn out, an interworking rod 39 in which a lower portion moves up and down due to motion of interworking lever 38 and tube 36 elastically supported by an elastic member 39b is coupled to an upper portion, and a slide protrusion 39a fallen out from a holding groove 31a formed at one side part of engaging lever 31 when interworking rod 39 moves up.

Herein, slide protrusion 39a is routinely positioned at M sensor unit 10.

As shown in FIG. 7B, the safety button provided in automatic lever 8 is pressed to actuate interworking cancelling member 34 before entering integrated mode 6, such that shift rod 7 may be decoupled from engaging lever 31 after entering integrated mode 6.

That is, as the safety button is pressed, interworking pin 35 moves down and solenoid 37 is actuated, such that slide protrusion 39a moves up through interworking lever 38. As a result, interworking pin 35 is fallen out from holding groove 31a of engaging lever 31.

Therefore, even though shift rod 7 is moved due to automatic lever 8, engaging lever 31 is free of shift rod 7.

In this state, when M mode 5 or integrated mode 6 is implemented, engaging lever 31 is restrained in close contact with a bracket portion of lever housing 1 by actuation of M holding member 32 or integrated mode holding member 33.

Figure 8A:
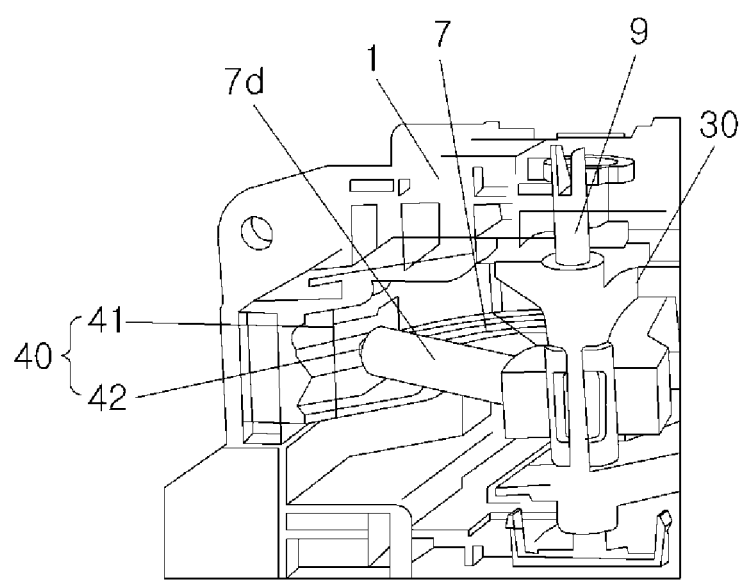
FIG. 8 is a configuration diagram of a manipulation feeling unit for giving a shift manipulation feeling during the M mode or integrated mode according to the exemplary embodiment of the present invention.

Referring to FIG. 8A, manipulation feeling unit 40 includes a groove formed by using an inner surface of lever housing 1 on a movement path of M mode 5 and integrated mode 6 of shift rod 7 and a bullet 42 coupled by using a bullet shaft 7d of shift rod 7 facing groove 41 with the end thereof being in contact with groove 41.

Groove 41 includes a D groove 41a forming the manipulation feeling for the D (driving) position of automatic mode 4, an M groove 41a formed to M mode 5 based on D groove 41a, and an integrated mode groove 41c formed to integrated mode 6 based on D groove 41a.

Herein, M groove 41b and integrated mode groove 41c are depressed more deeply with respect to D groove 41a to form stages.

Figure 8B:
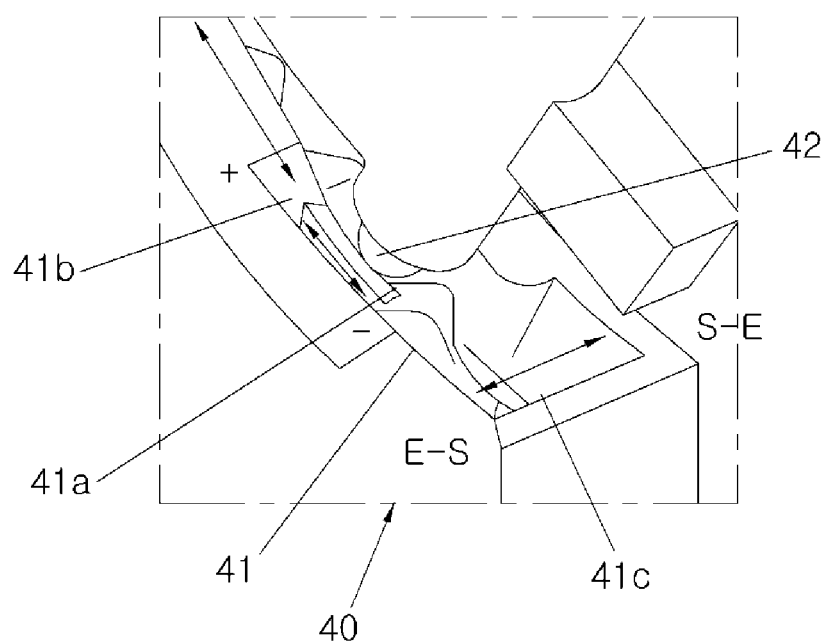

As shown in FIG. 8B, D groove 41a assigns the shift manipulation feeling when moving automatic lever 8 in the D (driving), M groove 41b assigns the shift manipulation feeling when moving automatic lever 8 in M mode 5, and integrated mode groove 41c assigns automatic lever 8 in integrated mode 6.

In this case, one end portion of M groove 41b is the M+ position and the other end portion is the M– position, and one end portion of integrated mode groove 41c is the E-S position and the other end portion is the S-E position.

Bullet 42 has the end portion contacting groove 41, which has a ball shape to minimize friction resistance when moving along groove 41 while contacting groove 41.

FIG. 9 shows movement of automatic lever at the time of implementing the integrated mode and in the exemplary embodiment, interworking cancelling member 34 is first actuated by pressing the safety button as described in FIG. 7 at the time of implementing the integrated mode.

As described above, after interworking cancelling member 34 is actuated by pressing the safety button, automatic lever 8 positioned at the D (driving) position may be moved to the E-S of integrated mode 6 as shown in FIG. 9A.

While shift rod 7 coupled to automatic lever 8 is moved to integrated mode 6 by the moving manipulation, second lever protrusion 7b of shift rod 7 is pushed together to be inserted into interworking space 21 of movement block 21.

As described above, the movement from the D (driving) to the E-S or S-E of integrated mode 6 represents a positional change from D groove 41a to integrated mode groove 41c of groove 41, and as a result, a driver can feel the shift manipulation feeling.

FIG. 9B shows an operational state of integrated mode sensor unit 2 when the D (driving) position is moved to the E-S position after moving to the integrated mode. As shown in FIG. 9B, while shift rod 7 and movement block 21 are coupled together, when automatic lever 8 is pushed to the left side backward to move from the D (driving) position to the E-S position, movement block 21 moves together in a movement direction of automatic lever 8 through second lever protrusion 7b of shift rod 7.

In this case, at the time when the movement of automatic lever 8 from the D (driving) position to the E-S position is completed, engaging lever 31 also receives force in the movement direction of automatic lever 8 through second lever protrusion 7b of shift rod 7 to generate movement with shift shaft 9 as the hinge shaft, but the control cable moving the shift stage is not influenced by the small movement.

Subsequently, when movement block 21 moves together in the movement direction of automatic lever 8, rotary shaft 22 rotates through pinion 22a engaged to rack gear 21b of movement block 21 and eccentric cam 23 fixed to rotary shaft 22 rotates in the same direction as rotary shaft 22, such that phases of an N pole and an S pole of a magnet 26 provided in eccentric cam 23 are changed.

A cam eccentric portion pushes roller 25a of variable roller 25 while eccentric cam 23 rotates to generate repelling power by compression transformation of elastic member 25c in variable roller 25, and as a result, the driver can recognize that the D (driving) is changed to the E-S in integrated mode 6.

During the process, detection sensor 27 transmits to ECU 50 an electrical signal changed depending on polar change of magnet 26 by rotation and ECU 50 processes the electrical signal by applying the electrical signal to a logic and thereafter, outputs a signal value determined to control control target 70 according to the processing result.

Figure 10:
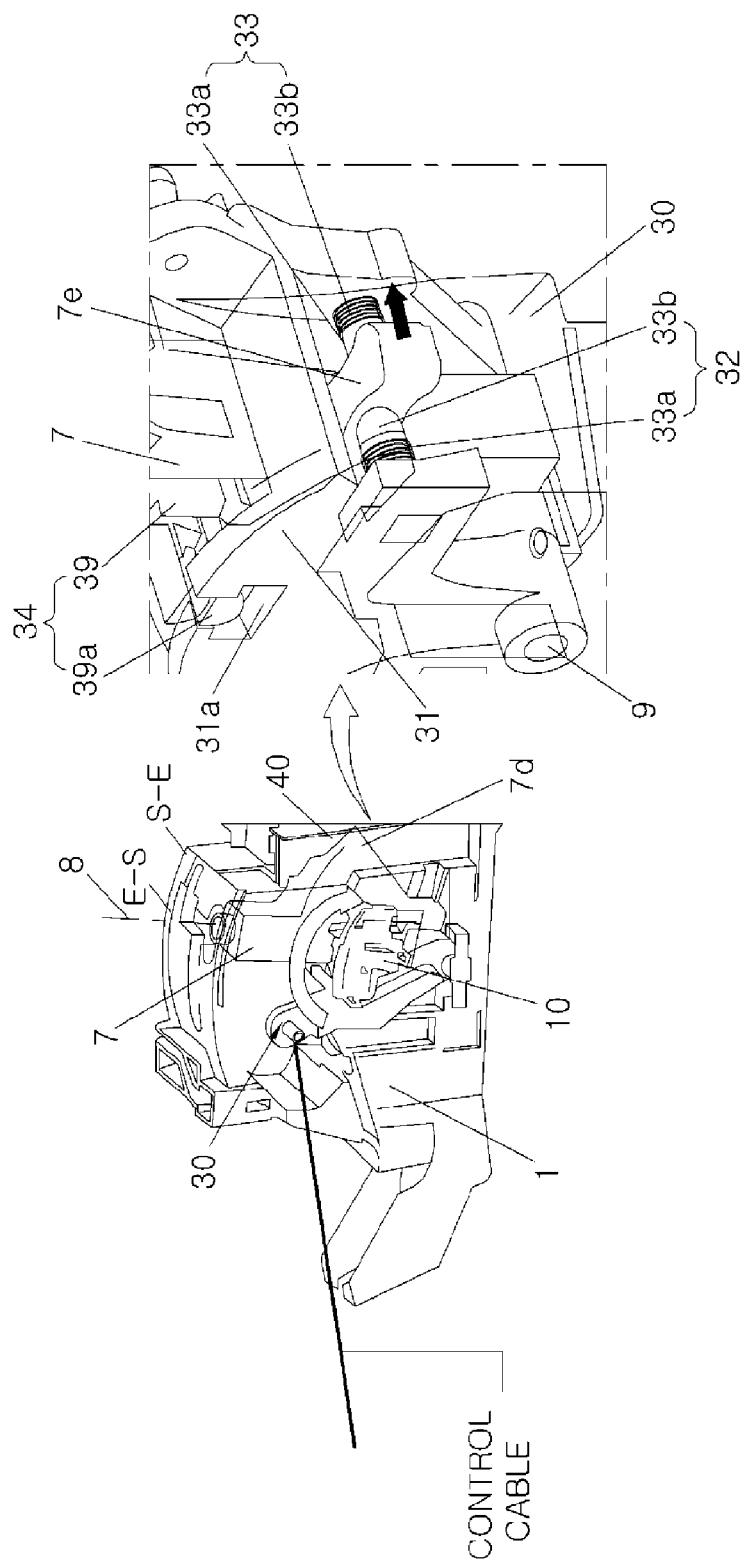
FIG. 10 is a diagram showing movement to the integrated mode and the resulting operation of the driving holding unit according to the exemplary embodiment of the present invention.

FIG. 10 shows an operational state of driving holding unit 30 when moving from the D (driving) position to the S-E position after moving to the integrated mode as described above.

When automatic lever 8 moves from the D (driving) to the E-S position of integrated mode 6, shift rod 7 coupled with automatic lever 8 is inclined in the same direction due to automatic lever 8 as shown in FIG. 10A, and as a result, integrated mode holding member 33 receives force from contact protrusion 7e protruding from shift rod 7.

As described above, when integrated mode holding member 33 receives force from shift rod 7, lock pin 33a presses the side part (right) of engaging lever 31 while compressing return spring 33b and engaging lever 31 receiving the force is in close contact with an internal bracket portion of lever housing 1 to form fixation force to prevent the D (driving) position from being changed.

M holding member 32 is positioned at the opposite side to integrated mode holding member 33 with shift rod 7 therebetween. Due the layout, when automatic lever 8 is moved to M mode 5, the action is implemented similarly as integrated mode holding member 33.

Figure 11:
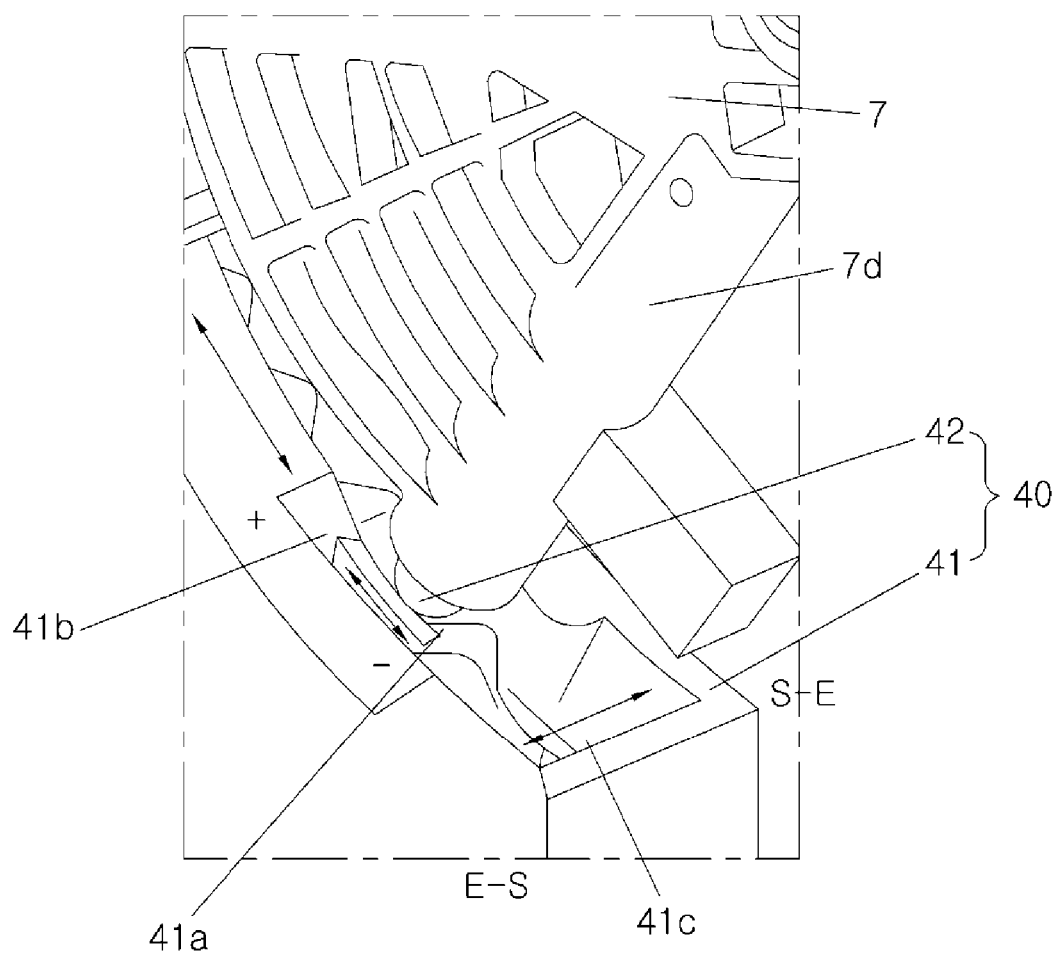
FIG. 11 is a diagram showing movement to the integrated mode and the resulting operation of the manipulation feeling unit according to the exemplary embodiment of the present invention.
Figure 12A:
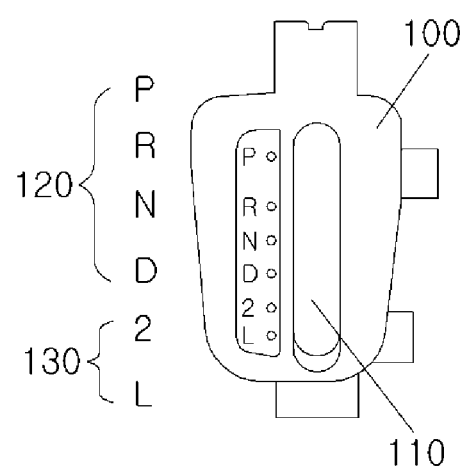
FIG. 12 is a gate pattern for the M mode routinely provided in a shift-by-wi automatic lever device.
Figure 12B:
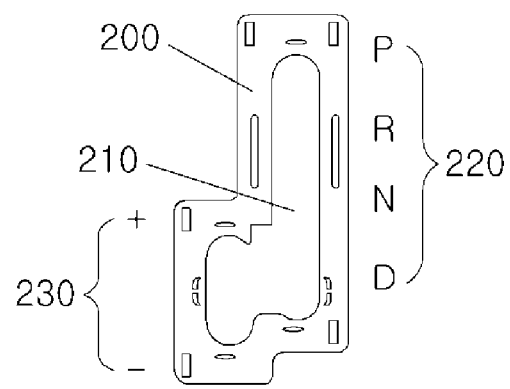
Figure 12C:
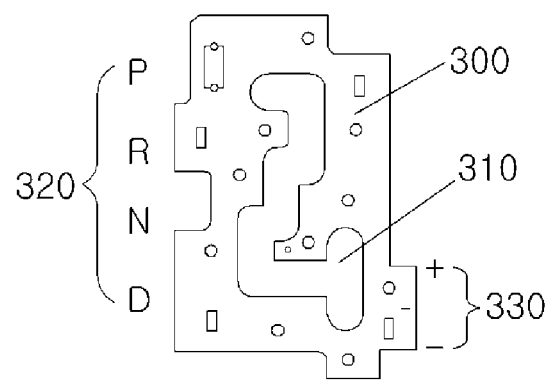

Referring to FIG. 11, when automatic lever 8 is at the D (driving) position, bullet 42 coupled with bullet shaft 7d of shift rod 7 is positioned in D groove 41a to provide a D (driving) shift manipulation feeling to the driver.

When the driver moves automatic lever 8 to M mode 5 at the D (driving) position, bullet shaft 7d of shift rod 7 also moves to M mode 5 together with automatic lever 8, such that bullet 42 moves to M groove 41b over D groove 41a.

In this case, bullet 42 moves to M groove 41b which is lower than D groove 41a and during this process, the shift manipulation feeling by moving from the D (driving) to M groove 41b may be provided to the driver.

When the driver moves automatic lever 8 to integrated mode 6 at the D (driving) position, bullet shaft 7d of shift rod 7 also moves to integrated mode 6 together with automatic lever 8, such that bullet 42 moves to integrated mode groove 41c over D groove 41a.

In this case, bullet 42 moves to integrated mode groove 41b which is lower than D groove 41a and during this process, the shift manipulation feeling by moving from the D (driving) to integrated mode groove 41c may be provided to the driver.

As described above, the integrated control shift lever device according to the exemplary embodiment provides M mode 5 of +/− to feel a dynamic shift manipulation feeling together with automatic mode 4 of P (parking), R (reverse), N (neutral), and D (driving) as a basic function and further provides integrated mode 6 to provide to engine control unit (ECU) 50 the electrical signal generated by positional change of automatic lever 8 to control the engine, suspension device, or the steering device in addition to the transmission by driver's simple manipulation, thereby significantly improving convenience and in particular, further improving performance, quality, and merchantability of an automobile when the integrated control shift lever device is applied to a vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An integrated control shift lever device, comprising:
    a gate pattern in which an automatic lever moving with being gripped by a hand moves in an automatic mode of P (parking), R (reverse), N (neutral), and D (driving) as a basic movement path,
    wherein in the gate pattern, an M mode in which an electrical signal for a + mode which is a 1-stage upshift acceleration state and a − mode which is a 1-stage downshift deceleration state is generated by moving the position of the automatic lever is branched from a D (driving) position to one side part of the automatic mode,
    an integrated mode in which at least one other electrical signal for controlling components of a vehicle regardless of control of a transmission is generated by moving the position of the automatic lever is linked to a straight path from the D (driving) position to be branched to a position which does not interfere with the M mode,
    wherein the integrated mode is implemented by using an integrated mode sensor unit sensing entrance positions of an E-S integrated mode and an S-E integrated mode, a driving holding unit holding a D (driving) state even though the automatic lever moves to the E-S integrated mode and the S-E integrated mode, and a shift feeling unit assigning a shift manipulation feeling depending on manipulating the E-S integrated mode or the S-E integrated mode, and
    wherein the integrated mode sensor unit includes:
        a movement block coupled to a shift rod coupled with the automatic lever and hinge-coupled to a lever housing through a shift shaft when the automatic lever moves toward the integrated mode; and
        a mode changing detecting unit detecting E-S→S-E positional movement and generates an effort feeling while switching linear movement into rotational motion of movement block depending on movement of the automatic lever from the E-S position to the S-E position.

2. The integrated control shift lever device as defined in claim 1, wherein in the integrated mode, different electrical signals are generated at the E-S and the S-E positions which are different movement positions of the automatic lever.

3. The integrated control shift lever device as defined in claim 1, wherein the mode changing detecting unit includes:
    an eccentric cam that rotates by being rack-pinion-coupled with the movement block;
    a pair of rollers supporting the eccentric cam at both lateral sides and at least one side thereof is pushed due to phase change by rotation of the eccentric cam to be compressed and elastically transformed to form the effort feeling; and
    a sensing member detecting the electrical signal for the E-S integrate mode or S-E integrated mode by detecting the phase change by the rotation of the eccentric cam.

4. The integrated control shift lever device as defined in claim 3, wherein the sensing member is a non-contact type.

5. The integrated control shift lever device as defined in claim 4, wherein the sensing member includes:
    a magnet that rotates together with the eccentric cam while being installed at the eccentric cam; and
    a detection sensor sensing N-S polar change depending on the rotation of magnet and transmitting an electrical signal transmitted to an engine control unit (ECU).

6. The integrated control shift lever device as defined in claim 1, wherein the driving holding unit includes:
    an engaging lever connected with a control cable pulled depending on the P (parking), the R (reverse), the N (neutral), and the D (driving) which are the automatic mode, which change the shift stage;
    an M holding member holding the engaging lever in an M mode state after the automatic lever enters the M mode;
    an integrated mode holding member holding the engaging lever in the integrated mode state; and
    an interworking cancelling member holding the D (driving) position after entering the M mode or integrated mode by decoupling the shift rod at the time of pressing a safety button provided in the automatic lever.

7. The integrated control shift lever device as defined in claim 6, wherein the M holding member and the integrated mode holding member respectively include:
    a lock pin that fixes the shift rod to the lever housing by pressing the engaging lever by receiving force from a transmission rod when the shift rod moves; and
    a return spring compressed when the lock pin is pushed to generate elastic repelling power.

8. The integrated control shift lever device as defined in claim 6, wherein the interworking cancelling member decouples the engaging lever and the shift rod from each other by action of a solenoid actuated by the ECU sensing the pushed safety button.

9. The integrated control shift lever device as defined in claim 1, wherein a manipulation feeling unit includes a groove formed by using an inner surface of the lever housing on a movement path of the M mode and the integrated mode of the shift rod and a bullet moving in contact with the groove.

10. The integrated control shift lever device as defined in claim 9, wherein the groove includes:
   an M groove forming the shift manipulation feeling for the D (driving) position; and
   an integrated mode groove forming the shift manipulation feeling for the integrated mode.

11. The integrated control shift lever device as defined in claim 10, wherein the M groove and the integrated mode groove are depressed more deeply with respect to the D groove to form stages.

12. The integrated control shift lever device as defined in claim 9, wherein the bullet is coupled by using a bullet shaft formed in a lower part of the shift rod.

13. The integrated control shift lever device as defined in claim 12, wherein the bullet has an end portion contacting the groove, which has a ball shape.

* * * * *